United States Patent
Theimer

(10) Patent No.: US 7,616,925 B2
(45) Date of Patent: Nov. 10, 2009

(54) METHOD FOR ACCESSING INFORMATION

(75) Inventor: Wolfgang Theimer, Bochum (DE)

(73) Assignee: Nokia Corporation, Espoo (FI)

( * ) Notice: Subject to any disclaimer, the term of this patent is extended or adjusted under 35 U.S.C. 154(b) by 307 days.

(21) Appl. No.: 10/311,898

(22) PCT Filed: Jun. 22, 2001

(86) PCT No.: PCT/EP01/07098

§ 371 (c)(1), (2), (4) Date: May 30, 2003

(87) PCT Pub. No.: WO01/99421

PCT Pub. Date: Dec. 27, 2001

(65) Prior Publication Data

US 2004/0014461 A1 Jan. 22, 2004

(30) Foreign Application Priority Data

Jun. 20, 2000 (DE) .................... 100 30 758

(51) Int. Cl.
*H04H 1/00* (2006.01)

(52) U.S. Cl. ............ 455/3.01; 455/3.02; 455/509; 455/515

(58) Field of Classification Search ....... 455/3.01–3.06, 455/184.1, 509, 515, 517, 552.1, 553.1, 12.1; 370/331; 705/10; 707/7; 709/205, 229; 713/155; 386/125

See application file for complete search history.

(56) References Cited

U.S. PATENT DOCUMENTS

| | | | | |
|---|---|---|---|---|
| 4,410,911 A | * | 10/1983 | Field et al. ............ | 380/238 |
| 5,191,457 A | * | 3/1993 | Yamazaki ............. | 398/79 |
| 5,961,603 A | * | 10/1999 | Kunkel et al. .......... | 709/229 |
| 6,018,768 A | | 1/2000 | Ullman et al. | |
| 6,314,289 B1 | * | 11/2001 | Eberlein et al. ......... | 455/427 |
| 6,411,774 B1 | * | 6/2002 | Tomita et al. .......... | 386/125 |
| 6,516,190 B1 | * | 2/2003 | Linkola ................ | 455/408 |
| 6,690,917 B2 | * | 2/2004 | Soliman et al. ......... | 455/12.1 |
| 6,792,284 B1 | * | 9/2004 | Dalsgaard et al. ....... | 455/525 |
| 2001/0031642 A1 | * | 10/2001 | Matsuyama ........... | 455/517 |
| 2002/0013780 A1 | * | 1/2002 | Brown et al. .......... | 707/7 |
| 2002/0036995 A1 | * | 3/2002 | Dalsgaard ............. | 370/331 |
| 2002/0049814 A1 | * | 4/2002 | Yoo ................... | 709/205 |
| 2003/0055707 A1 | * | 3/2003 | Busche et al. ......... | 705/10 |

FOREIGN PATENT DOCUMENTS

| | | |
|---|---|---|
| CN | 1251723 A | 4/2000 |
| DE | 4241857 | 6/1994 |
| DE | 4427046 | 2/1996 |
| DE | 19502923 | 8/1996 |
| DE | 19513005 | 9/1996 |

(Continued)

*Primary Examiner*—Nay A. Maung
*Assistant Examiner*—Tuan H Nguyen
(74) *Attorney, Agent, or Firm*—Alston & Bird LLP

(57) ABSTRACT

The invention relates to a method for accessing information, especially for accessing additional information to information which is audibly and/or visually presented to a user, in which the information presented to the user comprises individual information sections to which additional information is allocated, and in which the additional information can be transmitted via a transmission channel during the presentation of the information so that it can be provided for later use on request.

20 Claims, 1 Drawing Sheet

FOREIGN PATENT DOCUMENTS

Figure 1:
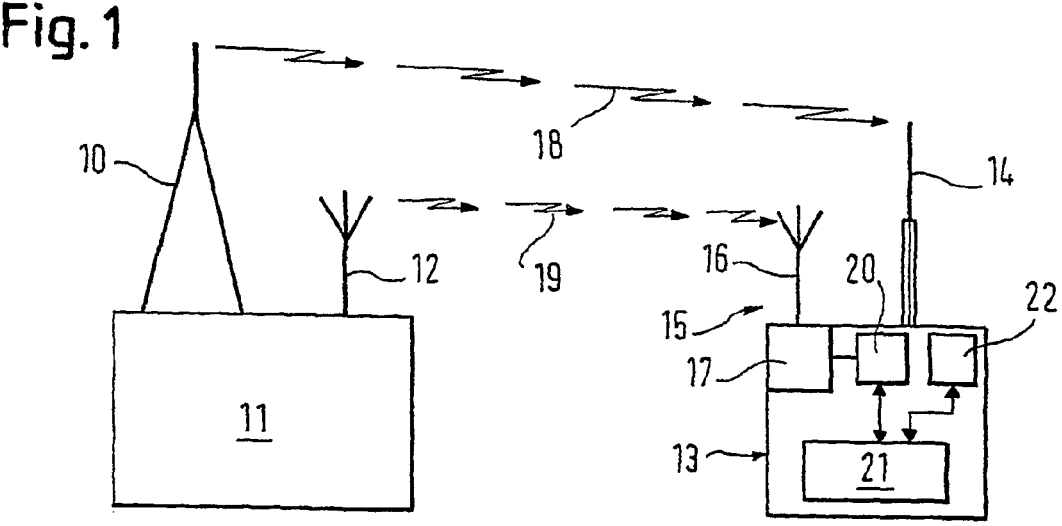

| | | |
|---|---|---|
| DE | 19645435 | 5/1998 |
| DE | 19753050 | 8/1998 |
| DE | 4434277 | 7/1999 |
| DE | 19846985 | 5/2000 |
| DE | 19930780 | 1/2001 |
| DE | 19956804 | 6/2001 |
| DE | 10011702 | 9/2001 |
| EP | 0 991 213 * | 9/1999 |
| EP | 0 991 213 * | 5/2000 |
| WO | 9528803 | 10/1995 |

* cited by examiner

METHOD FOR ACCESSING INFORMATION

The invention relates to a method for accessing information, especially for accessing additional information to information which is presented audibly and/or visually to a user.

During the presentation of information, for example in radio or television broadcasts, background information on current subjects is frequently only mentioned briefly. For pieces of music, for example, often only the precise title or the disc or CD on which this piece of music can be found is briefly mentioned. In interviews or reports, too, corresponding background or secondary information such as publications of the interviewee, books or lecture dates and the like are frequently mentioned only once briefly. Even if the listener or viewer of a radio or TV broadcast notes down immediately such information which is of interest to him, errors may occur which, at the least, make it difficult to find the desired piece of music, book or lecture event or the like. However, a user is frequently not able to make notes immediately which increases the probability of errors and makes it considerably more difficult to find the desired information.

It is true that, in the case of radio or television broadcasts, it is then possible to call up the corresponding radio or broadcast station and ask them for the desired information if the listener or viewer has remembered the title and time of the broadcast. However, this is extremely laborious and time consuming.

To provide a remedy in this case, a method for accessing information is described in U.S. Pat. No. 5,907,322, which enables a television viewer to obtain the reference source notes, Internet addresses, telephone numbers and the like given during television broadcasts, especially during commercials. For this purpose, the television viewer inputs a reminder instruction by means of the remote control during the transmission of the television event to be remembered, in order to generate a "bookmark" and store it in an activity table. Each recorded bookmark in the activity table includes date, clock time and channel of the transmitter. The recorded bookmarks are then transmitted via the Internet to a service provider where the corresponding information such as reference addresses, Internet addresses, telephone numbers and the like are picked out from a corresponding database for each of the bookmarks and are transmitted to the television viewer via the Internet.

The invention is based on the object of providing a further method for accessing information which, in particular, enables a user to access in a simple manner and without great effort, additional information to information which is presented audibly and/or visually.

This object is achieved by the method according to claim 1. Advantageous further developments and embodiments of the invention are described in the subclaims.

Thus, according to the invention, it is provided that the information presented to the user comprises individual information sections to which additional information is allocated, and that the additional information can be transmitted via a transmission channel during the presentation of the information so that it can be provided for later use on request. It is particularly appropriate if the additional information is transmitted on a transmission channel which is physically separate from the presentation of the information.

Thus, the method according to the invention enables a user to obtain the desired additional information with the aid of a simple request even during the presentation of the information, that is to say when he is listening to a radio broadcast or is viewing a television broadcast, so that the user can make further use of the additional information after the presentation of the information has ended, that is to say after the radio or television broadcast has ended.

In this context, the content of the additional information can be very simple or also very complex.

It can consist, for example, of one or more information terms such as, for example, a name, a telephone or fax number, a street address, an Internet address, an E-mail address, a GPS (Global Positioning System) position (e.g. for a meeting place), a time (e.g. for an event) or the like. The format of the additional information can also vary greatly depending on the system used. For example, it is possible to standardize and transmit the additional information as data record according to the "contact card" standard used by Nokia in the Nokia Communicator. However, other standardized data formats such as those used in Internet browsers can also be used. In the simplest case, an ASCII code can be used for the content of the additional information.

In an advantageous embodiment of the invention, it is provided that the information is presented continuously as an information stream, that the additional information is transmitted at the same time as the information stream and that, on request, additional information allocated to an information section of the information stream is stored at the receiver end so that it can be accessed at a later time. This makes it possible to implement the method according to the invention in a particularly simple manner since the storing of the additional information following the user request is performed completely at the receiver end. Thus, it is not required that a request for transmitting the additional information must first be made to an information provider.

In another advantageous further development of the information, it is provided that the information is transmitted as radio broadcast whilst the additional information is transmitted via a data channel used as transmission channel in such a manner that, on request, the additional information allocated to the information or program section currently being transmitted can be stored at the receiver end for later use in each case, the additional information allocated to a program section being transmitted at the beginning of the program section and temporarily stored at the receiver end, additional information previously temporarily stored being deleted, and the temporarily stored additional information being stored for later use on request.

The information provider, that is to say, for example, the radio or television transmitter, thus presents a broadcast which can be visually and/or audibly perceived by a user. In parallel with the broadcast, a second data stream of preferably computer-readable additional information is transmitted which supplements the program information. The additional information is transmitted, correlated in time with the broadcast information, to the user where the additional information is temporarily stored in the radio or television set or in a suitable add-on device. In each case, the additional information is valid for as long as the associated program section is being transmitted. During the validity of the additional information, that is to say when the additional information is temporarily stored, it can be stored following a request signal from the user so that it is available for further use independently of the progress of the radio or television broadcast.

In another embodiment of the invention, it is provided that, together with a request for additional information to an information section currently being presented, data identifying this information section are transmitted to an additional-information provider and, following the request, additional information allocated to the identified information section is transmitted to the requester stored and is there at the receiver end so that it can be accessed at any time.

In this case, another operating mode is used for accessing additional information since the additional information is supplied by the information provider. This procedure has the advantage that the transmission channel for the additional information does not need to be set up during the entire broadcast.

To simplify access to additional information further, it is provided in an advantageous embodiment of the invention that the information is continuously presented as information stream, especially as radio broadcast, and the data identifying the information section comprise an information stream identifier, especially a transmitter identifier and the time of the request, the time of the request, in particular, being determined at the provider end.

When additional information is requested, it can be additionally provided that the data identifying the information section comprise a position identifier which designates the location of the user.

This makes it possible, in the case of additional information on a particular broadcast which contains information relevant to different regions, for this information relevant to a region to be filtered in accordance with the position identifier. If, for example, reference is made to a tour of an artist in a broadcast, it is possible to announce to a user requesting additional information associated with this announcement, in dependence on his location, only the dates and places of the artist's appearance which are located in the vicinity of his location.

The spontaneous request for additional information is of interest not only in connection with radio and television broadcasts but also if a travelling user needs information about his current whereabouts. Correspondingly, it is provided in an advantageous embodiment of the invention that the information presented takes the form of objects seen by a user which he perceives in a particular region and the data identifying the objects as information sections comprise a region identifier and a position identifier designating the location of the user, the data identifying the objects as information sections comprising the time of the request, the time of the request, in particular, being determined at the provider end. This enables the user to leaf through a type of electronic guidebook which in each case provides the precise information of interest at the respective location of the user.

Thus, for example, a user can have transmitted information on historic buildings and places, opening times of museums and restaurants.

This method can be handled in a particularly simple manner if the position identifier is generated by means of a GPS (Global Positioning System) module.

In a particularly appropriate embodiment of the invention, it is provided that a radio data channel, especially a data channel according to the GPRS (General Packet Radio Service) standard in a GSM radio network is used as transmission channel for additional information.

Figure 2:
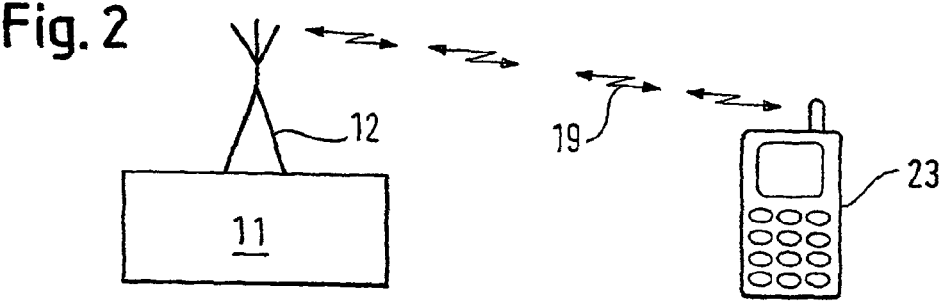
Figure 3:
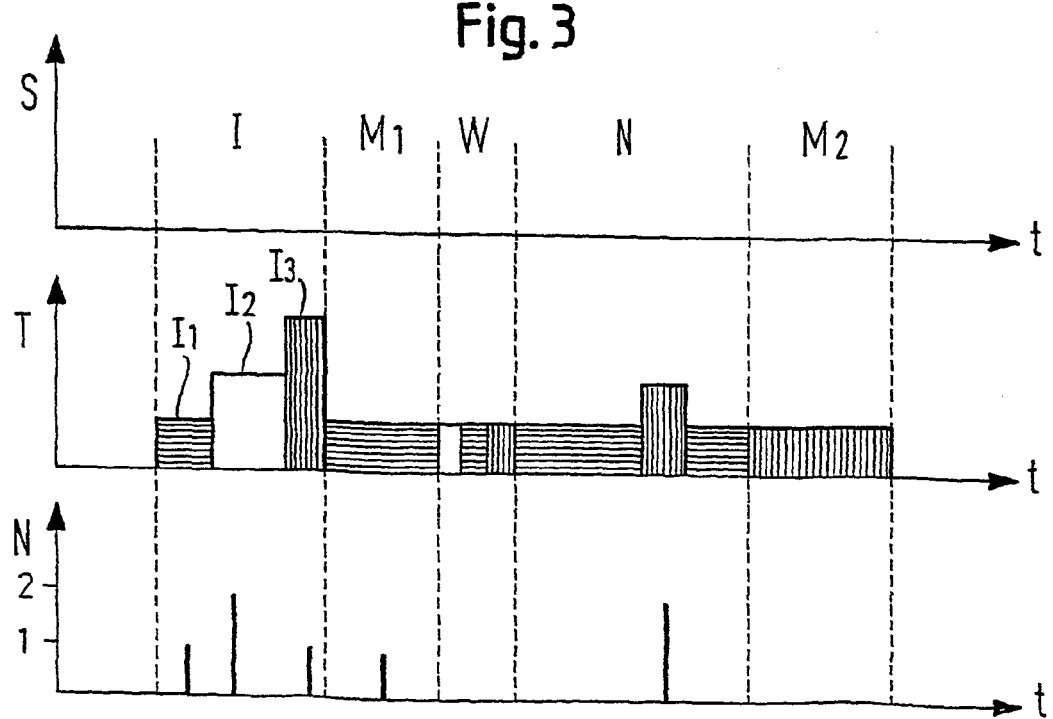

In the text which follows, the invention will be explained in greater detail by way of example with reference to the drawing, in which:

FIG. 1 shows a simplified diagrammatic representation of an information transmission system for carrying out the method according to the invention, FIG. 2 shows a simplified diagrammatic representation of another information transmission system for carrying out the method according to the invention, and FIG. 3 shows various timing diagrams for illustrating the allocation of the additional information to the contents of sections of a radio broadcast which is used as example for the information to be presented.

In the various figures of the drawing, mutually corresponding elements are provided with the same reference designations.

The information transmission system shown diagrammatically in FIG. 1 comprises a RF (radio-frequency) transmitter 10 of an information provider 11 via which information, for example radio or television broadcasts, are transmitted. In addition, a second transmitter 12 operating at radio frequencies is provided via which additional information to the radio or television broadcasts is transmitted.

At the receiving end, a receiver arrangement 13 is provided which comprises a first receiver 14, only indicated as an antenna, for broadcast information, that is to say for radio or television broadcasts, and a transceiver arrangement 15 which has a transceiver antenna 16 and a radio-frequency section 17.

When the information provider 11, during the transmission of a radio or television broadcast via a radio channel 18, transmits additional information associated with the transmitted program on a data channel 19 via the second transmitter 12, the radio or television program is received and reproduced in the receiver arrangement 13 at the user end whilst the additional information is transmitted by the radio-frequency stage into a buffer store 20 where it is stored. The additional information which is preferably transmitted as data packets on the data channel is in each case stored in the buffer for as long as the additional information transmitted is related to an information section or a program section.

If a user wants to access the additional information, he inputs, for example by pressing a key or by a voice instruction, a corresponding control instruction which causes a control unit 21 to read out the additional information stored in the buffer store 20 and to transmit it into a memory 22 in which the additional information is kept available for later use.

As shown in FIG. 3, for example, a radio transmission which is here considered as an information stream has various sections such as, for example, an interview I, a piece of music M1, advertising W, news N, another piece of music M2 etc. which are considered as information sections which, in turn, can be subdivided into smaller information sections. For example, it is assumed here that the interview I is composed of three sections, each of which is associated with additional information. In the exemplary embodiment shown here, as shown in the bottom diagram of FIG. 3, an additional-information unit is associated with the first section I1 whereas two additional-information units, that is to say, for example, two data records, representing the additional information, of a predetermined data record format, are associated with the second interview section I2. In this arrangement, the additional information remains temporarily stored until a new additional information item has been transmitted via the data channel 19 which overwrites the previous additional information in the buffer store 20 or until it is deleted, due to there no longer existing a connection with a broadcast, e.g. following a corresponding deletion signal or due to an elapsed validity period.

The new or more recent additional information is suitably transmitted in such a manner that the previous additional information is deleted as soon as its correlation with a program section is lost. The additional information associated with the first piece of music M1 is thus retained during the period of the piece of music. In the subsequent advertising section, to which the music title is no longer related, the corresponding data record is also no longer available as additional information. To implement this, a timing information can be attached together with the data record representing the additional information, which indicates when the data record is to be deleted. However, it is also possible to transmit with each new program section, this can be each new commercial in the case of advertising or each new report or each new headline in the case of news, additional information which, if no special additional information is provided, only indicates that the additional information previously temporarily stored must be deleted.

In particular, it is necessary to delete additional information which is no longer current since a listener would otherwise be unnecessarily irritated.

If, for example, a user switches on his radio set, which is used as receiver arrangement 13, only during the second piece of music M2 and requests additional information allocated to this piece of music, he would presumably be annoyed if he received, instead of the desired music title, intermediate information which was allocated to a report or event notice during the preceding news broadcast.

Apart from this first operating mode of the method according to the invention in which, in parallel with the data stream provided for the audible or audio/visual reproduction, computer-readable additional information is transmitted to the receiver arrangement 13 of a user, in which the individual information sections or data records of the additional information are in each case stored for as long as there is correlation to the radio program, it is provided, in another operating mode of the invention, that the additional information is only transmitted to the user on request.

The information transmission system for this comprises a transceiver arrangement 12' of an information provider 11, in which a list of the respective additional information is stored together with correlation data which correlate the respective additional information with the main information offered to a user. At the receiver end, a transceiver arrangement is provided which, for example, is represented as a mobile telephone by means of which the additional information can be called up from the information provider 11.

For the radio broadcast indicated diagrammatically in FIG. 3, the various additional-information sections shown in the last line of FIG. 3 are correlated with the start and end times of the individual program sections illustrated in the centre line.

If a listener, using the mobile telephone 23, requests desired additional information via a data channel 19, an information content designating the program currently being heard is transmitted together with the request. In addition, the data record representing the request can also contain a timing information which is required for the unambiguous identification of the desired additional information. However, it is also possible that the timing information is simply determined from the time of reception at the information provider 11. Knowing the time of the request and of the transmitted program enables the desired additional information to be unambiguously identified, which is then transmitted back to the requesting user via the data channel 19.

This procedure can applied not only to radio broadcasts but it is conceivable that, for example, in a movie theatre, information related to the individual commercials during the initial advertising, for example restaurant addresses, telephone numbers or the like, is provided to the public which can then call up this information with a suitable transceiver arrangement.

However, the correlation of the additional information with an information item presented to a user does not necessarily need to consist of a transmitting or presentation time but can also consist of a presentation location if the information presented to a user is sights or other items of interest such as, for example, hotels or restaurants of a city for which there is an electronic guidebook available.

In this case, for example, a user, using a suitable transceiver arrangement, for example a mobile telephone 23, sends a location information item to the information provider 11 which thereupon transmits back the additional information existing for this location. In this arrangement, the location of the user can also be determined by a GPS (Global Positioning System) module and added to the data packet representing the request.

The additional information can be transmitted in accordance with various standards as long as they are suitable for the data transmission. In a GSM radio network, it is appropriate for the data channels to be operated in accordance with the GPRS standard.

The present invention thus provides that an information or data stream presented to a user is completed with computer-readable additional information which in each case only has validity for a short period of time. The individual information is only available for as long as the user hears or sees the associated information. If the user wants additional information, he can then access the additional information with the aid of a corresponding request instruction and store it for later use. After the presentation of the data or information has ended, that is to say after the radio or television broadcast has ended, or immediately, the user can access the stored additional information for further use in the same device or in another device such as, for example, a PC or a telephone.

The invention claimed is:

1. Method for accessing information, especially for accessing additional information to information including at least one of a radio broadcast and television broadcast, wherein the information is audibly and/or optically presented to a user, in which:

the information presented to the user is communicated via a first channel by a first transmitter and comprises individual information sections to which additional information is continuously allocated, and;

the additional information is transmitted at the same time via a second channel by a second transmitter, wherein the additional information is information to the broadcast currently communicated, wherein the second channel is a data channel that is physically separate from the first channel used for the presentation of the information, during the presentation of the information so that the additional information can be presented to the user on request, wherein the first channel is received by a first receiver and the second channel is separately received by a second receiver.

2. Method according to claim 1, wherein the information is presented continuously as an information stream, and the additional information is transmitted at the same time as the information stream, and on request, additional information allocated to an information section of the information stream is stored at the receiver end so that the additional information can be accessed at a later time.

3. Method according to claim 2, wherein the information is transmitted as radio broadcast whilst the additional information is transmitted via a data channel used as transmission channel in such a manner that, on request, the additional information allocated to the information or program section currently being transmitted can be stored at the receiver end for later use in each case.

4. Method according to claim 1, wherein the information is transmitted as radio broadcast whilst the additional information is transmitted via a data channel used as transmission channel in such a manner that, on request, the additional information allocated to the information or program section currently being transmitted can be stored at the receiver end for later use in each case.

5. Method according to claim 4, wherein the additional information allocated to a program section is transmitted at the beginning of the program section and is temporarily stored at the receiver end, additional information previously temporarily stored being deleted, and in that the temporarily stored additional information is stored for later use on request.

6. Method according to claim 1, wherein together with a request for additional information to an information section currently being presented, data identifying this information section are transmitted to an additional-information provider, and following the request, additional information allocated to the identified information section is transmitted to the requester and is stored there at the receiver end so that the additional information is accessible at any time.

7. Method according to claim 6, wherein the information is continuously presented as information stream, especially as radio broadcast, and the data identifying the information section comprise an information stream identifier, especially a transmitter identifier and the time of the request, the time of the request, in particular, being determined at the provider end.

8. Method according to claim 7, wherein the data identifying the information section comprise a position identifier which designates the location of the user.

9. Method according to claim 6, wherein the information presented is objects seen by a user which he perceives in a particular region, and the data identifying the objects as information sections comprise a region identifier and a position identifier designating the location of the user.

10. Method according to claim 9, wherein the data identifying the objects as information sections comprise the time of the request, the time of the request, in particular, being determined at the provider end.

11. Method according to claim 8, 9 or 10, wherein the position identifier is generated by means of a GPS (Global Positioning system) module.

12. Method according to claim 1, wherein a radio data channel, especially a data channel according to the GPRS (General Packet Radio Service) standard in a GSM radio network is used as transmission channel for additional information.

13. Method according to claim 1, wherein the information and the additional information are transmitted in parallel.

14. Method according to claim 1, wherein the information and the additional information are transmitted from physically separate sources.

15. Method according to claim 1, wherein the additional information is computer readable data.

16. A system for accessing additional information in addition to information including at least one of a radio broadcast and television broadcast, wherein the information is audibly and/or optically presented to a user, the system comprising:

an information provider capable of transmitting the information and the additional information; and a receiver arrangement in communication with the information provider to receive both the information and the additional information, wherein the information presented to the user is communicated via a first channel by a first transmitter and comprises individual information sections to which additional information is continuously allocated, and wherein the additional information is transmitted at the same time via a second channel by a second transmitter, wherein the additional information is information to the broadcast currently communicated, wherein the second channel is a data channel that is physically separate from the first channel used for the presentation of the information, during the presentation of the information so that the additional information is capable of being presented to the user on request, and wherein the first channel is received by a first receiver and the second channel is separately received by a second receiver.

17. An apparatus for accessing information, especially for accessing additional information in addition to information including at least one of a radio broadcast and television broadcast, wherein the information is audibly and/or optically presented to a user of the apparatus, the apparatus comprising:

a first receiver for receiving the information from a first transmitter via a first channel; and a second receiver for receiving the additional information from a second transmitter via a second channel, wherein the information presented to the user is communicated via a first channel and comprises individual information sections to which additional information is continuously allocated, wherein the additional information is received at the same time via a second channel, wherein the additional information is information to the broadcast currently communicated, wherein the second channel is a data channel that is physically separate from the first channel used for the presentation of the information, during the presentation of the information so that the additional information is capable of being presented to the user on request, wherein the first channel received by the first receiver and the second channel received by the second receiver are separately received.

18. An apparatus for providing information, especially for accessing additional information in addition to information including at least one of a radio broadcast and television broadcast, wherein the information is audibly and/or optically presented to a user, the apparatus comprising:

a first transmitter for transmitting the information; and a second transmitter for transmitting the additional information, wherein the information presented to the user is communicated via a first channel and comprises individual information sections to which additional information is continuously allocated, wherein the additional information is transmitted at the same time via a second channel, wherein the additional information is information to the broadcast currently communicated, wherein the second channel is a data channel that is physically separate from the first channel used for the presentation of the information, during the presentation of the information so that the additional information is capable of being presented to the user on request, and wherein the first channel is to be received by a first receiver and the second channel is to be separately received by a second receiver.

19. A computer program product for accessing additional information in addition to information including at least one of a radio broadcast and television broadcast, wherein the information is audibly and/or optically presented to a user, the computer program product comprising at least one computer-readable storage medium having computer-readable program code portions stored therein, the computer-readable program code portions comprising:

a first executable portion for receiving the information from a first transmitter; and a second executable portion for receiving the additional information from a second transmitter, wherein the information presented to the user is communicated via a first channel and comprises individual information sections to which additional information is continuously allocated, wherein the additional information is transmitted at the same time via a second channel, wherein the additional information is information to the broadcast currently communicated, wherein the second channel is a data channel that is physically separate from the first channel used for the presentation of the information, during the presentation of the information so that the additional information is capable of being presented to the user on request, wherein the first channel is received by a first receiver and the second channel is separately received by a second receiver.

20. An apparatus for accessing information, especially for accessing additional information in addition to information, the apparatus comprising:

a first receiver for receiving information from a first transmitter via a first channel, wherein the information includes at least one of a radio broadcast and television broadcast, wherein the information is audibly and/or optically presented to a user of the apparatus; and a second receiver for receiving additional information from a second transmitter via a second channel, wherein the additional information is correlated in time with related portions of the information, wherein the information comprises individual information sections to which the additional information is continuously allocated, wherein the additional information is received at the same time via a second channel wherein the additional information is information to the broadcast currently communicated, wherein the second channel is a data channel that is physically separate from the first channel used for the presentation of the information, during the presentation of the information so that the additional information is capable of being presented to the user on request, wherein the first channel is received by a first receiver and the second channel is separately received by a second receiver, and wherein the additional information is only accessible during the transmission of the information except that, in response to receipt of a user input, the additional information is stored to enable access to the additional information after completion of the transmission of the information.

* * * * *

UNITED STATES PATENT AND TRADEMARK OFFICE
CERTIFICATE OF CORRECTION

PATENT NO.        : 7,616,925 B2                                    Page 1 of 1
APPLICATION NO. : 10/311898
DATED             : November 10, 2009
INVENTOR(S)       : Wolfgang Theimer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 670 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,616,925 B2 | Page 1 of 1 |
| APPLICATION NO. | : 10/311898 | |
| DATED | : November 10, 2009 | |
| INVENTOR(S) | : Theimer | |

It is certified that error appears in the above-identified patent and that said Letters Patent is hereby corrected as shown below:

Title page,

Item (30) Foreign Application Priority Data:

"Jun. 20, 2000" should read --Jun 23, 2000--.

Signed and Sealed this
Twelfth Day of April, 2011

David J. Kappos
*Director of the United States Patent and Trademark Office*